Patented Feb. 19, 1952

2,586,098

UNITED STATES PATENT OFFICE 2,586,098

NEW STABLE SYNTHETIC RESIN EMULSIONS AND PROCESS FOR THE PREPARATION THEREOF

Luzius Schibler, Basel, Switzerland, assignor to Ciba Limited, Basel, Switzerland, a Swiss firm No Drawing. Application November 3, 1947, Serial No. 783,844. In Switzerland November 18, 1946

18 Claims. (Cl. 260—6)

The present invention relates to new stable synthetic resin emulsions and to the preparation thereof.

Aqueous emulsions of hardenable synthetic resins present great advantages in many fields of use over the corresponding lacquers prepared by dissolution in organic solvents. Apart from the fact that expensive organic solvents are thereby saved, it is much more convenient, less dangerous from the standpoint of fires, and hygienically less objectionable to work with aqueous systems.

It has already been proposed, in U. S. Patent No. 2,196,367, to prepare stable, aqueous and water-dilutable emulsions of water-insoluble, organic solvent-soluble urea-formaldehyde-alcohol condensates which are dissolved in essentially water immiscible alcohols, by dispersing alcoholic solutions of the said condensates in aqueous solutions of water-soluble cellulose ethers and of long chain-substituted ammonium salts.

Relatively water-fast effects may be realized on materials treated with such emulsions, by short heat treatment. However, the use of water-soluble cellulose ethers as basis for such emulsions involves the disadvantage that the cellulose ethers remain soluble upon the thermally-effected hardening of the synthetic resins and thus reduce the water- and wash-fastnesses of the effects. In addition, the color shade and particularly the feel of the treated materials are frequently unfavorably influenced.

It has also been proposed to use casein as emulsifier for the preparation of aqueous dispersions of water-insoluble urea resins. Care must be taken, in this regard, that the casein is not coagulated during storage by the small quantities of formaldehyde which are always liberated from such resins and which results in an irreversible gelation of the emulsion preparations. According to the data in British Patent No. 543,860, a large quantity of ammonia is added to the otherwise already strongly basic casein-triethanolamine solution in order to prevent this coagulation. This addition converts the formaldehyde which may be present and that which forms, into hexamethylenetetramine and renders it non-injurious.

Apart from the fact that strongly basic casein solutions generally hydrolyze rapidly and are decomposed, the presence of ammonia in such systems assures no lasting stability because the formed hexamethylenetetramine in time also exerts a hardening action on casein, so that while the coagulation of the protein and the destruction of the emulsion caused thereby is, it is true, referred it is not entirely prevented. The basic reaction of this type of binding agent is, moreover, undesired since it is unfavorable for the hardening of the emulsified synthetic resin which is generally catalyzed by means of acid.

The applicant's U. S. Patent No. 2,361,277 also discloses that it is possible to prepare—from solutions containing casein, carbamides and formaldehyde—paste-like emulsions of organic, water-immiscible solvents which may also contain water-insoluble, solvent-soluble synthetic resins, and which are suitable for the finishing of textiles. A disadvantage of this process resides in the fact that here formaldehyde is added in aqueous, i. e. free, form so that the preparation and working up of the emulsions are practically unavoidably encumbered by formaldehyde vapors.

A primary object of the present invention is the embodiment of a process of the aforesaid character which, however, obviates the aforementioned disadvantages and which results in a series of new and useful stable aqueous emulsions of water-insoluble, organic solvent-soluble, hardenable condensates from formaldehyde, substances of amide-character which form hardenable aminoplasts with formaldehyde, and essentially water-immiscible alcohols.

To this end, briefly stated, the condensate, which is dissolved in an essentially water-immiscible organic solvent, is emulsified in an aqueous solution which contains, together with a protein, at least one hydrotropic carbamide which forms hardenable aminoplasts with formaldehyde.

Illustrative of substances of amide character which form hardenable aminoplasts with formaldehyde and which may serve for the preparation of the water-insoluble, organic solvent-soluble, hardenable condensates which can be used according to the present invention, are urea, thiourea, guanidine, biuret, dicyandiamide, melamine, etc., while suitable substantially water-immiscible alcohols according to the invention include alcohols such as butyl alcohol, amyl alcohol, hexyl alcohol, cyclohexanol, benzyl alcohol, etc.

The hardenable condensates themselves are obtained in known manner by the simultaneous condensation of the enumerated components with formaldehyde or by the preparation of methylol compounds from the substance of amide character and etherification of the methylol compounds with the alcohols. In both cases, the alcohol which is not used up in the etherification may serve as the solvent for the condensate so that solutions of condensates may be obtained which are directly usable in the present process. It is however manifestly within the scope of the invention to use other solvents according to the invention for dissolving the condensates instead of or simultaneously with the excess alcohol.

Urea or thiourea or mixtures of urea and thiourea are, in the sense of the present invention, suitable hydrotropic carbamides which form hardenable aminoplasts with formaldehyde. According to Neuberg (Biochemische Zeitschrift, vol. 76 [1916], page 107 those readily soluble compounds of predominantly neutral reaction which have the peculiar capacity of bringing substances, which per se are insoluble, into solution in water may be termed hydrotropic. Thus, as is known, it is possible, for instance, to dissolve casein without the addition of basic substances in concentrated aqueous solutions of the aforenamed carbamides according to the invention. The hydrotropic carbamides are used in quantities which, for example with casein, amount to about 50-300 parts of carbamide per 100 parts of casein.

Of the proteins, the one that is primarily suitable for the present process is acid casein. Particularly homogeneous and stable emulsions are obtained when use is made of essentially lactalbumin-free casein which has been purified in known manner, for instance, according to U. S. Patent 2,372,986. However, in addition to casein, other soluble proteins such for example as gelatin or fish glue may also be used.

The new emulsions may be prepared by first dissolving the protein together with the hydrotropic carbamide in water, generally also using basic substances such for example as sodium hydroxide or potassium hydroxide, ammonia, soda, borax, trisodium phosphate, triethanolamine, and cyclohexylamine in the case of certain proteins, such as casein and the like. Depending upon the type and quantity of the added substances, it is thus possible to obtain a solution which is neutral, or which ranges from a weakly acid to a basic solution.

This protein solution forms in all cases the outer aqueous phase of the emulsions and, as such, may contain a whole series of dissolved or suspended additaments, for example substances which form hardenable aminoplasts with formaldehyde, such as biuret, dicandiamide, etc.; also substances which are suitable for the improvement of fibrous materials, such as emulsifiers, softeners, anti-foaming agents, wetting agents, fillers, paraffin, and especially pigments of all kinds; also hardening agents, such for example as ammonium thiocyanate, tartaric acid diethyl ester and the like, and also buffering agents such as citrates and the like.

The inner oily phase contains the hardenable resin in solution in a greater or less degree of concentration. The liquid of the oily phase itself may consist of solvent which is water-immiscible or only partly miscible with water such as the benzine which is used for solvent extraction or lacquer benzine, sangajol, xylol, chlorobenzene, tetraline and the like; preferably however it consists of the previously enumerated alcohols. The oily phase may also contain additions of all kinds such for example as softeners or other water-insoluble organic solvent-soluble binding agents and resins, and also pigments and the like, whereby the properties may be widely varied.

The emulsion formation proper takes places in the usual manner, the oily phase being gradually run into the well-agitated aqueous phase. The emulsions from very readily and are usually well dispersed. The stability extends over several months, in some cases for more than a year, notwithstanding the fact that the films which in many cases are as clear as glass, are very readily hardenable after being dried and give very water-fast effects after heating to high temperatures, for example for several minutes, to 150° C.

The possibility of use of the new artificial resin emulsions is naturally manifold in character. They may be used for instance as binding agents, adhesives, finishing agents, impregnating agents in the wood, paper, leather and textile industries, i. e. wherever it is desired to produce a waterproof, and in some cases also washing-proof, adhesive or binding effect in a simple manner by means of a stable preparation.

The parts recited in the following illustrative examples of the invention are parts by weight.

Example 1

50 parts of acid casein are dissolved in 300 parts of water with addition of 150 parts of urea. In the resultant slightly viscous solution, there are emulsified 500 parts of a solution of a urea-formaldehyde-butanol resin in butanol, which resin solution has a dry content of about 60% by weight. A well-dispersed unctuous emulsion is obtained which, notwithstanding its clearly acid reaction (pH 5.15), is characterized by excellent stability.

Example 2

60 parts of technical casein, 50 parts of thiourea and 6 parts of triethanolamine are dissolved in 384 parts of water. In the solution, there are emulsified 500 parts of an approximately 47% by weight solution of a urea-formaldehyde resin, etherified with a mixture of hexyl and octyl alcohol, in a mixture of hexyl and octyl alcohol. There is formed a perfectly dispersed, stable thickly viscous emulsion which dries to a clear film.

Example 3

150 parts of pure casein are dissolved in a solution of 150 parts of urea and 12 parts of 30% by weight caustic soda solution in 288 parts of water, and 8 parts of ammonium thiocyanate and 2 parts of sodium lauryl sulfate are added. In the resultant solution, with the aid of a suitable apparatus, there are emulsified 390 parts of a solution, in butyl alcohol, of a melamine-formaldehyde resin which has been etherified with butyl alcohol, which resin solution has a dry content of about 70% by weight. A storable, thickly viscous oil-in-water emulsion is obtained.

Example 4

1625 parts of a casein purified according to Example 4 of U. S. Patent No. 2,372,986 are dissolved in 3050 parts of water, with addition of 1300 parts of urea, 325 parts of thiourea and 200 parts of borax. To the obtained casein solution, there are added 100 parts of 40% by weight sodium citrate solution of neutral reaction and 400 parts of highly sulfonated castor oil. In the obtained mixture which serves as the outer aqueous phase there are emulsified 3000 parts of the solution, mentioned in Example 1, of urea-formaldehyde-butanol resin. As well dispersed, thickly viscous emulsion is obtained. Pigments of all kinds, fillers, softening agents, etc. may, if desired, be added at any suitable stage in the preparation.

*Example 5*

In a solution containing 160 parts of casein, 200 parts of urea, 40 parts of dicyandiamide, 8 parts of 25% by weight ammonia solution and 392 parts of water there are emulsified 200 parts of an approximately 44% by weight solution, in benzyl alcohol, of a urea-formaldehyde resin etherified with benzyl alcohol. 1000 parts of a viscous emulsion which has a weakly alkaline reaction are obtained.

*Example 6*

150 parts of pure acid casein and 95 parts of urea are dissolved in 285 parts of water with addition of 20 parts of 20% by weight caustic soda solution, 30 parts of glycerine and 45 parts of 10% by weight phosphate buffer solution of pH 6.70. In the obtained solution, there is emulsified a lacquer consisting of 225 parts of a hardenable urea-formaldehyde resin etherified with butyl alcohol, 45 parts of tricresyl phosphate and 105 parts of xylol. A stable viscous emulsion is obtained which, upon drying, leaves behind a glass-clear film and which can be diluted with water to form a very fine milky dispersion.

*Example 7*

25 parts of casein purified according to Example 4 of U. S. Patent No. 2,372,986, 20 parts of urea, 5 parts thiourea, 3 parts of borax and 2 parts of sulforicinoleate are dissolved in 145 parts of water. In the thinly-fluid aqueous phase, there is emulsified a solution of 40 parts of urea-formaldedyde-butanol resin in 560 parts of monochlorobenzene and 200 parts of benzine of a boiling point of 100–140° C. An unctuous emulsion is obtained which dries to a film which is readily hardenable by heat.

If instead of the above mentioned resin solution there is used as inner phase a pigmented laquer containing 40 parts of urea-formaldehyde-butanol resin, 660 parts of monochlorobenzene and 100 parts of titanium white, there is also obtained a stable unctuous emulsion which, diluted with 4–10 parts of water, can be used for matting artificial silk.

By using a colored pigment instead of titanium white, an emulsion is obtained which serves for the production of colored effects, which can be fixed in wash- and water-fast form by heat treatment.

*Example 8*

To 250 parts of fish glue with a dry content of 45% by weight, 125 parts of urea are added and the whole then diluted with 125 parts of water. Into this solution, there are emulsified 500 parts of an approximately 34.5% by weight solution in cyclohexanol of a resin made from urea, thiourea, formaldehyde and cyclohexanol. A slightly viscous stable adhesive is obtained.

*Example 9*

150 parts of gelatin are dissolved in 300 parts of water with addition of 150 parts of a mixture of urea and thiourea in the ratio of 4:1. This solution serves as aqueous phase for the emulsification of 400 parts of the solution, mentioned in Example 1, of a urea-formaldehyde-butanol resin. A viscous, non-gelling, heat-hardenable glue of good stability is obtained.

*Example 10*

144 parts of molten paraffin are finely dispersed in 656 parts of an ammoniacal solution containing 40 parts of gelatin and 40 parts of fish glue. This dispersion is carefully mixed with 700 parts of an emulsion containing 12.5 parts of casein, 37.5 parts of urea, 550 parts of water and, as inner phase, 100 parts of urea-formaldehyde-butanol resin. There are obtained 1500 parts of thixotropic milky liquid which, diluted with water, can be used as an impregnating agent.

Having thus disclosed the invention, what is claimed is:

1. A process for the manufacture of a stable, aqueous emulsion of a water-insoluble, organic solvent-soluble, hardenable condensate from formaldehyde, from a hardenable aminoplasts-forming substance of the group consisting of urea, thiourea, guanidine, biuret, dicyandiamide and melamine and from a substantially water-immiscible alcohol, which process comprises emulsifying the condensate dissolved in a substantially water-immiscible organic solvent, in an aqueous solution which contains a hydrotropic carbamide of the group consisting of urea and thiourea and also contains a protein.

2. A process for the manufacture of a stable, aqueous emulsion of a water-insoluble, organic solvent-soluble, hardenable condensate from formaldehyde, from a hardenable aminoplasts-forming substance of the group consisting of urea, thiourea, guanidine, biuret, dicyandiamide and melamine and from a substantially water-immiscible alcohol, which process comprises emulsifying the condensate dissolved in a substantially water-immiscible organic solvent, in an aqueous solution which contains a hydrotropic carbamide of the group consisting of urea and thiourea and a further hardenable aminoplasts-forming substance of the hereinbefore-mentioned group of such substances and also contains a protein.

3. A process for the manufacture of a stable, aqueous emulsion of a water-insoluble, organic solvent-soluble, hardenable condensate from formaldehyde, from a hardenable aminoplasts-forming substance of the group consisting of urea, thiourea, guanidine, biuret, dicyandiamide and melamine and from a substantially water-immiscible alcohol, which process comprises emulsifying the condensate dissolved in a substantially water-immiscible organic solvent, in an aqueous solution which contains a hydrotropic carbamide of the group consisting of urea and thiourea and also contains a protein and a basic substance, said basic substance in an amount to dissolve the protein together with the hydrotropic carbamide in water.

4. A process for the manufacture of a stable, aqueous emulsion of a water-insoluble organic solvent-soluble, hardenable condensate from formaldehyde, from a hardenable aminoplasts-forming substance of the group consisting of urea, thiourea, guanidine, biuret, dicyandiamide and melamine and from a substantially water-immiscible alcohol, which process comprises emulsifying the condensate dissolved in a substantially water-immiscible organic solvent, in an aqueous solution which contains a hydrotropic carbamide of the group consisting of urea and thiourea and also contains acid casein and a basic substance, said basic substance in an amount to dissolve the protein together with the hydrotropic carbamide in water.

5. A stable aqueous emulsion of a solution, in a substantially water-immiscible organic solvent, of a water-insoluble, organic solvent-soluble, hardenable condensate from formaldehyde, from a hardenable aminoplasts-forming substance of the group consisting of urea, thiourea, guanidine, biuret, dicyandiamide and melamine and from a substantially water-immiscible alcohol, in an aqueous solution which contains a hydrotropic carbamide of the group consisting of urea and thiourea and also contains a protein.

6. A stable aqueous emulsion of a solution, in a substantially water-immiscible organic solvent, of a water-insoluble, organic solvent-soluble, hardenable condensate from formaldehyde, from a hardenable aminoplasts-forming substance of the group consisting of urea, thiourea, guanidine, biuret, dicyandiamide and melamine and from a substantially water-immiscible alcohol, in an aqueous solution which contains a hydrotropic carbamide of the group consisting of urea and thiourea and a further hardenable aminoplasts-forming substance of the hereinbefore mentioned group of such substances and also contains a protein.

7. A stable aqueous emulsion of a solution, in a substantially water-immiscible organic solvent, of a water-insoluble, organic solvent-soluble, hardenable condensate from formaldehyde, from a hardenable aminoplasts-forming substance of the group consisting of urea, thiourea, guanidine, biuret, dicyandiamide and melamine and from a substantially water-immiscible alcohol, in an aqueous solution which contains a hydrotropic carbamide of the group consisting of urea and thiourea and also contains a protein and a basic substance, said basic substance in an amount to dissolve the protein together with the hydrotropic carbamide in water.

8. A stable aqueous emulsion of a solution, in a substantially water-immiscible organic solvent, of a water-insoluble, organic solvent-soluble, hardenable condensate from formaldehyde, from a hardenable aminoplasts-forming substance of the group consisting of urea, thiourea, guanidine, biuret, dicyandiamide and melamine and from a substantially water-immiscible alcohol, in an aqueous solution which contains hydrotropic carbamide of the group consisting of urea and thiourea and also contains acid casein and a basic substance, said basic substance in an amount to dissolve the protein together with the hydrotropic carbamide in water.

9. A process for the manufacture of a stable, aqueous emulsion of a water-insoluble, organic solvent-soluble, hardenable condensate from formaldehyde, urea and a substantially water-immiscible alcohol, which process comprises emulsifying the condensate dissolved in a substantially water-immiscible organic solvent, in an aqueous solution containing urea, acid casein and a basic substance, said basic substance in an amount to dissolve the protein together with the hydrotropic carbamide in water.

10. A process for the manufacture of a stable, aqueous emulsion of a water-insoluble, organic solvent-soluble, hardenable condensate from formaldehyde, urea and a substantially water-immiscible alcohol, which process comprises emulsifying the condensate dissolved in a substantially water-immiscible organic solvent, in an aqueous solution containing a mixture of urea and thiourea, acid casein and a basic substance, said basic substance in an amount to dissolve the protein together with the hydrotropic carbamide in water.

11. A process for the manufacture of a stable, aqueous emulsion of a water-insoluble, organic solvent-soluble, hardenable condensate from formaldehyde, melamine and a substantially water-immiscible alcohol, which process comprises emulsifying the condensate dissolved in a substantially water-immiscible organic solvent, in an aqueous solution containing a mixture of urea and thiourea, acid casein and a basic substance, said basic substance in an amount to dissolve the protein together with the hydrotropic carbamide in water.

12. A stable aqueous emulsion of a solution, in a substantially water-immiscible organic solvent, of a water-insoluble, organic solvent-soluble, hardenable condensate from formaldehyde, urea and a substantially water-immiscible alcohol, in an aqueous solution containing urea, acid casein and a basic substance, said basic substance in an amount to dissolve the protein together with the hydrotropic carbamide in water.

13. A stable aqueous emulsion of a solution, in a substantially water-immiscible organic solvent, of a water-insoluble, organic solvent-soluble, hardenable condensate from formaldehyde, urea and a substantially water-immiscible alcohol, in an aqueous solution containing a mixture of urea and thiourea, acid casein and a basic substance, said basic substance in an amount to dissolve the protein together with the hydrotropic carbamide in water.

14. A stable aqueous emulsion of a solution, in a substantially water-immiscible organic solvent, of a water-insoluble, organic solvent-soluble, hardenable condensate from formaldehyde, melamine and a substantially water-immiscible alcohol, in an aqueous solution containing a mixture of urea and thiourea, acid casein and a basic substance, said basic substance in an amount to dissolve the protein together with the hydrotropic carbamide in water.

15. A process for the manufacture of a stable, aqueous emulsion of a water-insoluble, organic solvent-soluble, hardenable condensate from formaldehyde, from a hardenable aminoplasts-forming substance of the group consisting of urea, thiourea, guanidine, biuret, dicyandiamide and melamine and from a substantially water-immiscible alcohol, which process comprises emulsifying the condensate dissolved in a substantially water-immiscible organic solvent, in an aqueous solution which contains a hydrotropic carbamide of the group consisting of urea and thiourea and also contains approximately 12% by weight of protein and a basic substance, said basic substance in an amount to dissolve the protein together with the hydrotropic carbamide in water.

16. A process for the manufacture of a stable, aqueous emulsion of a water-insoluble organic solvent-soluble, hardenable condensate from formaldehyde, from a hardenable aminoplasts-forming substance of the group consisting of urea, thiourea, guanidine, biuret, dicyandiamide and melamine and from a substantially water-immiscible alcohol, which process comprises emulsifying the condensate dissolved in a substantially water-immiscible organic solvent, in an aqueous solution which contains a hydrotropic carbamide of the group consisting of urea and thiourea and also contains approximately 12% by weight of acid casein and a basic substance said basic substance in an amount to dissolve the protein together with the hydrotropic carbamide in water.

17. A stable aqueous emulsion of a solution, in a substantially water-immiscible organic solvent, of a water-insoluble, organic solvent-soluble, hardenable condensate from formaldehyde, from a hardenable aminoplasts-forming substance of the group consisting of urea, thiourea, guanidine, biuret, dicyandiamide and melamine and from a substantially water-immiscible alcohol, in an aqueous solution which contains a hydrotropic carbamide of the group consisting of urea and thiourea and also contains approximately 25% by weight of protein and a basic substance, said basic substance in an amount to dissolve the protein together with the hydrotropic carbamide in water.

18. A stable aqueous emulsion of a solution, in a substantially water-immiscible organic solvent, of a water-insoluble, organic solvent-soluble, hardenable condensate from formaldehyde, from a hardenable aminoplasts-forming substance of the group consisting of urea, thiourea, guanidine, biuret, dicyandiamide and melamine and from a substantially water-immiscible alcohol, in an aqueous solution which contains hydrotropic carbamide of the group consisting of urea and thiourea and also contains approximately 25% by weight of acid casein and a basic substance, said basic substance in an amount to dissolve the protein together with the hydrotropic carbamide in water.

LUZIUS SCHIBLER.

REFERENCES CITED

The following references are of record in the file of this patent:

UNITED STATES PATENTS

| Number | Name | Date |
| --- | --- | --- |
| 2,356,794 | Peiker | Aug. 29, 1944 |
| 2,361,277 | Enderlin et al. | Oct. 24, 1944 |